(12) United States Patent
Lin et al.

(10) Patent No.: US 11,550,367 B2
(45) Date of Patent: Jan. 10, 2023

(54) HINGE FOR A FLEXIBLE ELECTRONIC DEVICE

(71) Applicant: FOSITEK CORPORATION, New Taipei (TW)

(72) Inventors: Chun-Han Lin, New Taipei (TW); Han-Cheng Zhu, Kaohsiung (TW)

(73) Assignee: FOSITEK CORPORATION, New Taipei (TW)

( * ) Notice: Subject to any disclaimer, the term of this patent is extended or adjusted under 35 U.S.C. 154(b) by 13 days.

(21) Appl. No.: 17/243,075

(22) Filed: Apr. 28, 2021

(65) Prior Publication Data

US 2022/0283611 A1    Sep. 8, 2022

(30) Foreign Application Priority Data

Mar. 3, 2021  (TW) ................................. 110107475

(51) Int. Cl.
 *G06F 1/16* (2006.01)

(52) U.S. Cl.
 CPC .......... *G06F 1/1681* (2013.01); *G06F 1/1652* (2013.01); *G06F 1/1616* (2013.01)

(58) Field of Classification Search
 CPC ..... G06F 1/1681; G06F 1/1652; G06F 1/1616
 See application file for complete search history.

(56) References Cited

U.S. PATENT DOCUMENTS 9,348,450 B1* 5/2016 Kim ..................... G06F 1/1616
9,848,502 B1* 12/2017 Chu ..................... G06F 1/1681
10,104,790 B2* 10/2018 Lee ...................... H05K 5/0017
10,317,950 B2* 6/2019 Chiang .................. F16C 11/04
10,365,692 B2* 7/2019 Yeh ....................... G06F 1/1647
10,480,225 B1* 11/2019 Hsu ............................ E05D 3/12
10,488,882 B2* 11/2019 Määttä ................. G06F 1/1616
10,545,541 B1* 1/2020 Dighde ................. F16M 11/06
10,761,572 B1* 9/2020 Siddiqui ............... G06F 1/1681
10,761,574 B1* 9/2020 Hsu ....................... G06F 1/1626
10,765,023 B2* 9/2020 Zhang ..................... G09F 9/301
10,795,415 B2* 10/2020 Cavallaro .............. B32B 37/12

(Continued)

FOREIGN PATENT DOCUMENTS

CN        108322567 A    7/2018
TW        202109478 A    3/2021

OTHER PUBLICATIONS

Taiwanese Search Report for Taiwanese Application No. 110107475, dated Oct. 29, 2021, with English translation.

*Primary Examiner* — Rockshana D Chowdhury
(74) *Attorney, Agent, or Firm* — Birch, Stewart, Kolasch & Birch, LLP

(57) ABSTRACT

A hinge is mountable between two casing parts of a flexible electronic device, and includes a base seat and two rotating modules disposed at two sides of the base seat for respectively mounting the casing parts thereon. Each rotating module includes a primary support plate pivotably connected to the base seat, and a secondary support plate pivotably connected to the primary support plate. When the rotating modules are rotated from an initial position, where the secondary support plates are flush with the primary support plates for resting and supporting a flexible display thereon, to a terminal position, where the secondary support plates are turned away to provide a leeway, the casing parts are shifted from an unfolded state to a folded state.

9 Claims, 10 Drawing Sheets

(56) References Cited

U.S. PATENT DOCUMENTS

| | | | | |
|---|---|---|---|---|
| 10,928,865 B1* | 2/2021 | Nakada | .................... | G06F 1/166 |
| 11,068,032 B2* | 7/2021 | Huang | .................. | G06F 1/1616 |
| 11,194,366 B2* | 12/2021 | Cheng | .................. | G06F 1/1652 |
| 11,223,710 B2* | 1/2022 | Cheng | .................. | G06F 1/1652 |
| 11,224,137 B2* | 1/2022 | Hsu | .......................... | E05D 3/18 |
| 11,237,596 B2* | 2/2022 | Kim | ........................ | G09F 9/301 |
| 11,243,564 B2* | 2/2022 | Kim | ....................... | G06F 1/1641 |
| 2015/0233162 A1* | 8/2015 | Lee | ....................... | G06F 1/1652 |
| | | | | 16/223 |
| 2021/0007229 A1* | 1/2021 | Gu | .......................... | G09F 9/301 |
| 2021/0011522 A1* | 1/2021 | Watamura | ............ | E05D 11/0054 |
| 2021/0216109 A1* | 7/2021 | Lin | ....................... | G06F 1/1675 |
| 2021/0381289 A1* | 12/2021 | Hsu | ....................... | H04M 1/022 |
| 2021/0397223 A1* | 12/2021 | Lee | ....................... | G06F 1/1681 |
| 2022/0137675 A1* | 5/2022 | Kuramochi | ............ | G06F 1/1616 |
| | | | | 361/679.27 |

* cited by examiner

HINGE FOR A FLEXIBLE ELECTRONIC DEVICE

CROSS-REFERENCE TO RELATED APPLICATION

This application claims priority of Taiwanese Patent Application No. 110107475, filed on Mar. 3, 2021.

FIELD

The disclosure relates to a hinge, and more particularly to a hinge adapted to be mounted between two casing parts of a flexible electronic device for mounting a flexible display thereon.

BACKGROUND

In recent years, flexible displays have been widely used for a variety of foldable electronic devices. These flexible displays have an infolding structure and an outfolding structure. In the infolding structure, a base seat of a hinge is disposed to generate an appropriate leeway for accommodating a bending portion of a flexible display and to prevent damage to the flexible display when the foldable electronic device is in a folded state. For this design, a clearance between two support plates of the hinge is made large when the foldable electronic device is in an unfolded state, which results in insufficient support force for the flexible display upon use, and is liable to cause formation of dents on the flexible display. Thus, the operation of the flexible display is adversely affected.

SUMMARY

Therefore, an object of the disclosure is to provide a hinge for a flexible electronic device that can alleviate at least one of the drawbacks of the prior art.

According to the disclosure, the hinge is mountable between two casing parts of a flexible electronic device for mounting a flexible display thereon. The hinge includes a base seat unit and two rotating modules. The base seat unit includes a base seat which is elongated in a front-rear direction and which has left and right sides opposite to each other in a left-right direction that is transverse to the front-rear direction. The rotating modules are respectively disposed at the left and right sides of the base seat, and respectively for mounting the casing parts thereon. Each of the rotating modules includes a primary support plate which is pivotably connected to a respective one of the left and right sides of the base seat and which has a primary support surface for resting the flexible display thereon, and a secondary support plate which is pivotably connected to the primary support plate and which has a secondary support surface that extends toward the other secondary support plate. The rotating modules are rotatable relative to the base seat between an initial position and a terminal position to shift the casing parts between an unfolded state and a folded state, respectively. In the initial position, the secondary support plates are spaced apart from each other in the left-right direction by a distance which is smaller than a distance between the primary support plates such that the secondary support surfaces are flush with the primary support surfaces in the left-right direction for resting the flexible display thereon. The secondary support plates have a width which is measured in the left-right direction and which is larger than a height of the base seat that is measured in an up-down direction transverse to both the front-rear direction and the left-right direction such that, in the terminal position, the secondary support plates are turned relative to the primary support plates away from the flexible display to abut against the base seat so as to provide a leeway between the secondary support plates.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
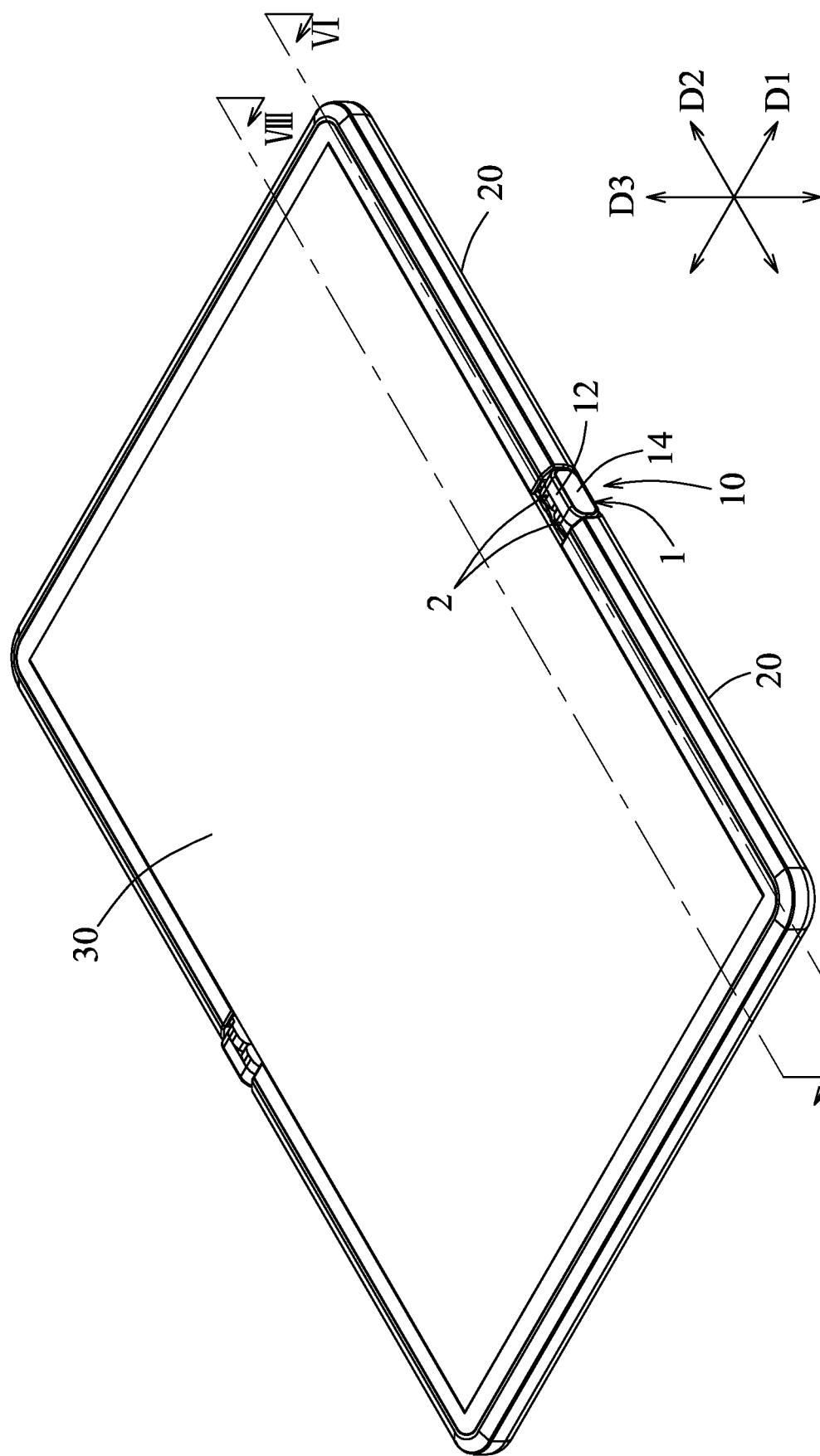
FIG. 1 is a perspective view illustrating an embodiment of a hinge according to the disclosure mounted on a flexible electronic device in an unfolded state.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
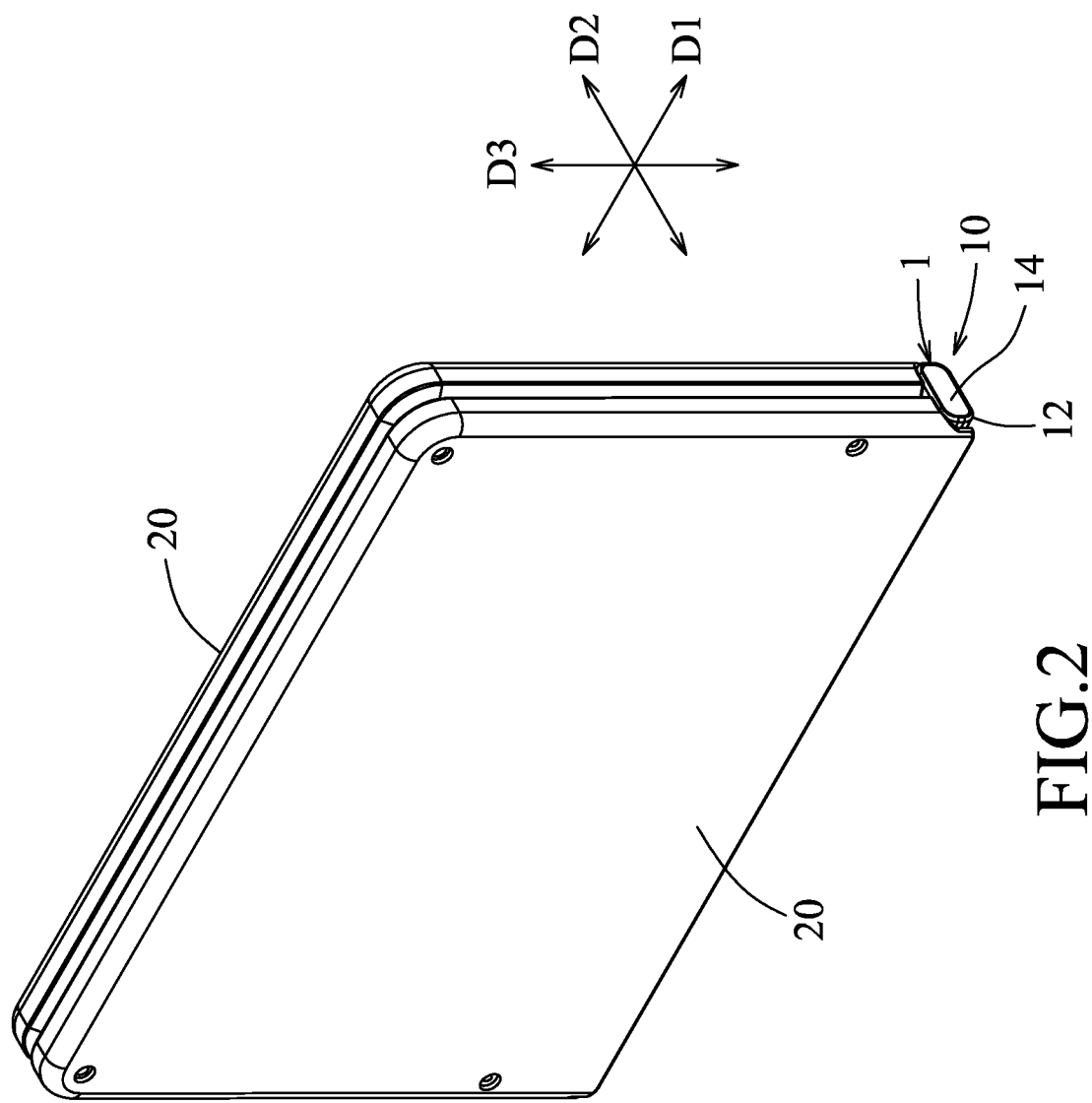
FIG. 2 is a perspective view similar to FIG. 1, illustrating that the flexible electronic device is in a folded state.
Figure 3:
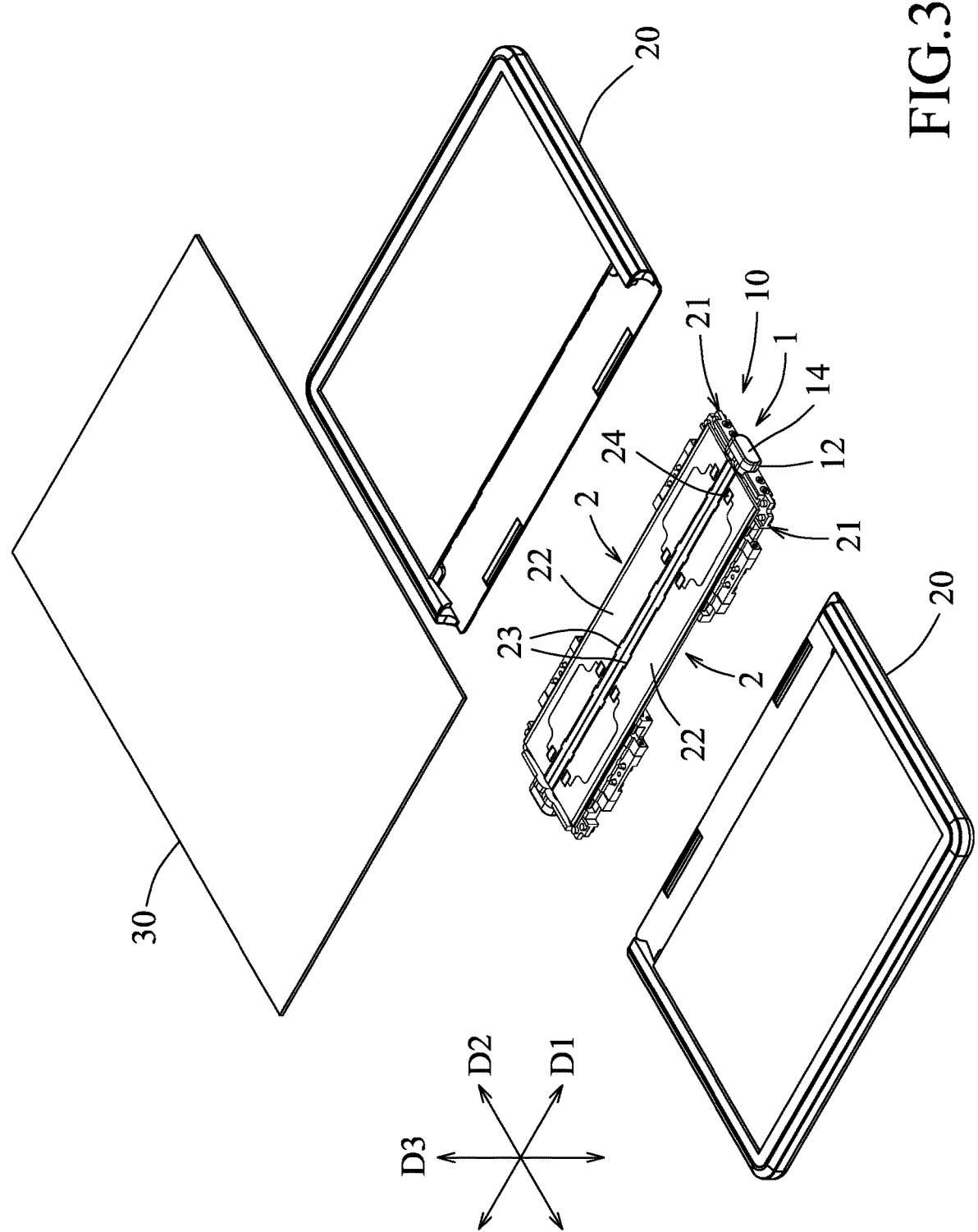
FIG. 3 is an exploded perspective view of FIG. 1.

Referring to FIGS. 1 to 3, an embodiment of a hinge 10 according to the disclosure is mounted between two casing parts 20 of a flexible electronic device for mounting a flexible display 30 thereon. In this embodiment, the flexible display 30 is securely disposed on the two casings 20, and the hinge 10 is provided to support, rather than secure the flexible display 30. The hinge 10 includes a base seat unit 1 and two rotating modules 2.

Figure 4:
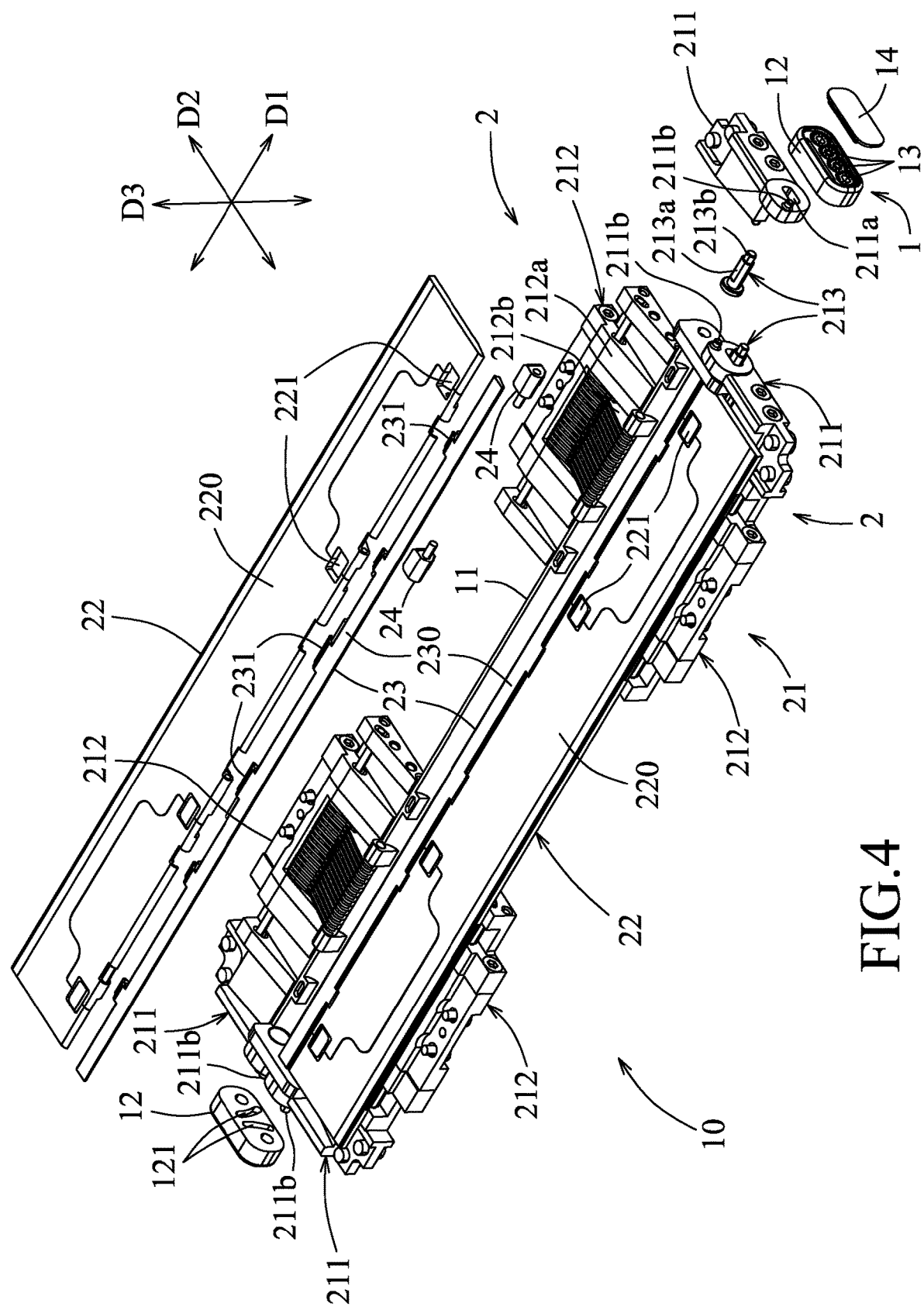
FIG. 4 is an exploded perspective view of the embodiment.
Figure 5:
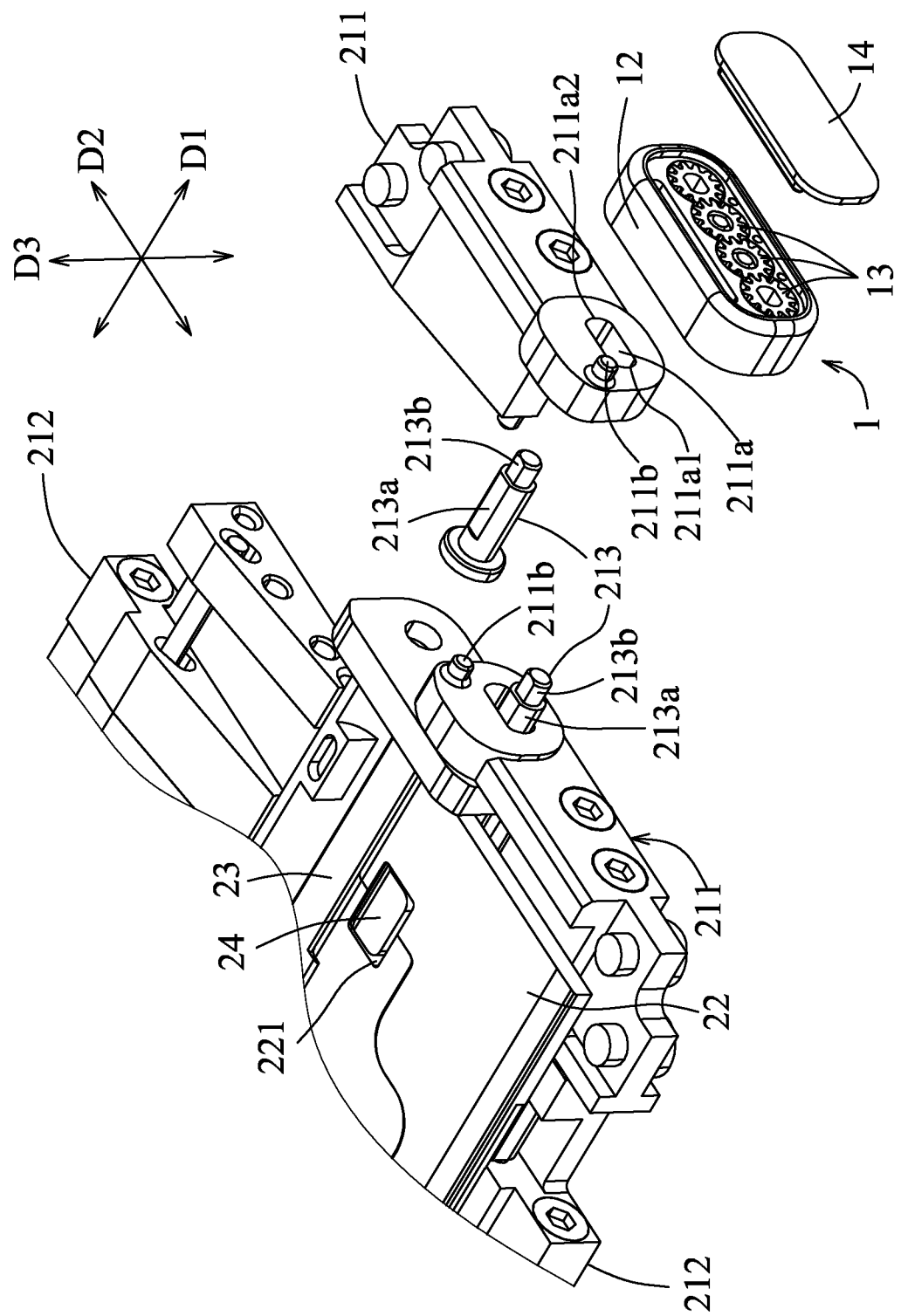
FIG. 5 is a fragmentary, exploded perspective view of a portion of the embodiment.
Figure 6:
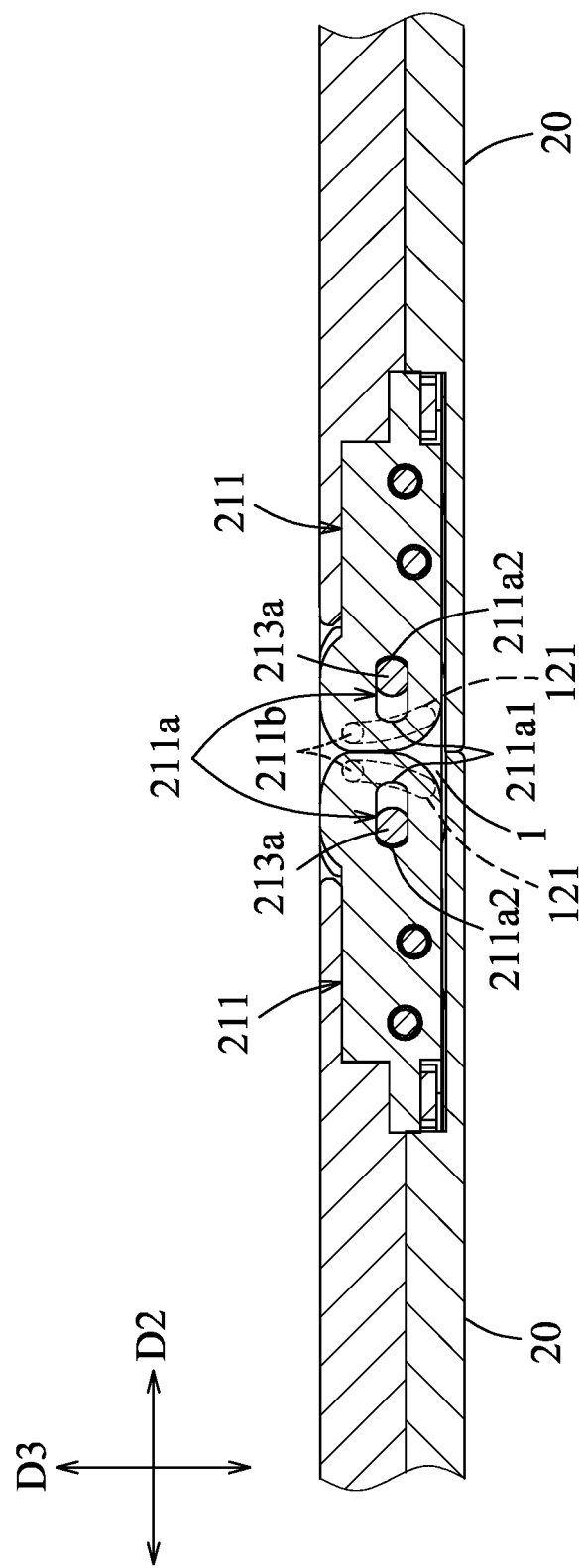
FIG. 6 is a fragmentary sectional view taken from line VI-VI of FIG. 1, illustrating that two rotating modules are in an initial position.
Figure 7:
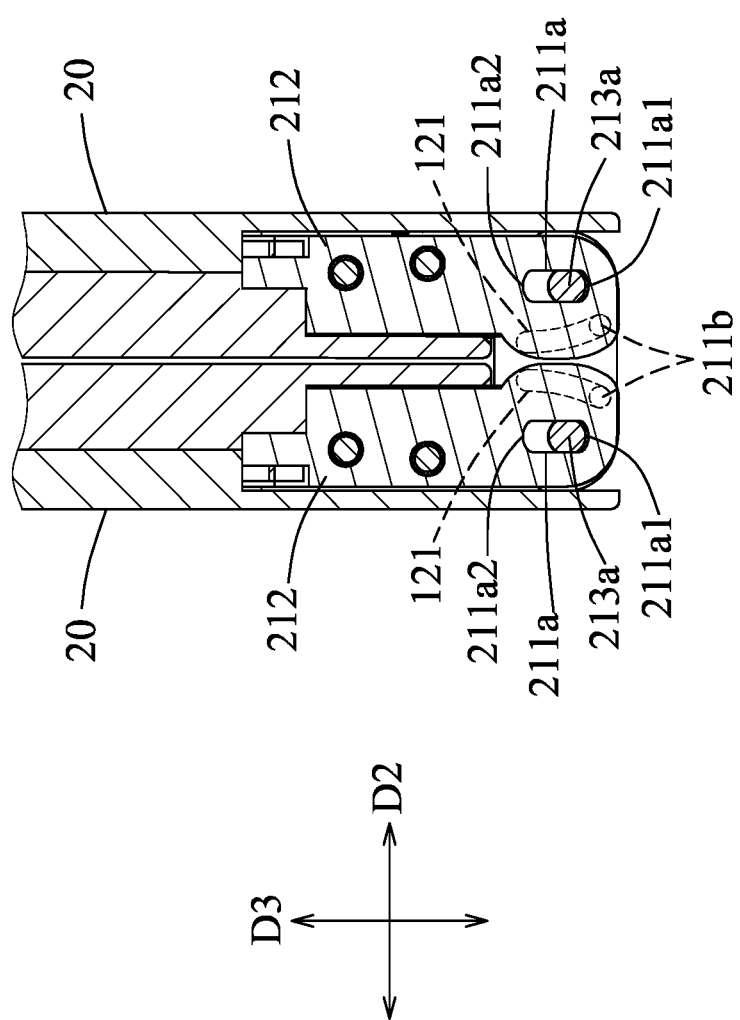
FIG. 7 is a fragmentary sectional view similar to FIG. 6, illustrating that the rotating modules are in a terminal position.

Referring to FIG. 4, the base seat unit 1 includes a base seat 11 which is elongated in a front-rear direction (D1) to have front and rear ends, and which has left and right sides opposite to each other in a left-right direction (D2) that is transverse to the front-rear direction (D1), two gear housings 12 which are respectively disposed on the front and rear ends of the base seat 11, two gear trains each of which includes a plurality of gears 13 received in a respective one of the gear housings 12, arranged along the left-right direction (D2), and meshing with each other, and two cover plates 14 which are respectively disposed outboard of the gear housings 12 to cover the gear trains.

Referring to FIGS. 4 to 8, the rotating modules 2 are respectively disposed at the left and right sides of the base seat 11, and are respectively for mounting the casing parts 20 thereon. The rotating modules 2 are rotatable relative to the base seat 11 between an initial position and a terminal position to shift the casing parts 20 between an unfolded state, where the flexible display 30 is unfolded, and a folded state, where the flexible display 30 is infolded, respectively. Each of the rotating modules 2 includes a rotating frame unit 21 which is rotatable relative to the base seat 11 and on which a respective one of the casing parts 20 is mounted, a primary support plate 22 which is pivotably connected to a respective one of the left and right sides of the base seat 11 and which has a primary support surface 220 for resting the flexible display 30 thereon, a secondary support plate 23 which is pivotably connected to the primary support plate 22 and which has a secondary support surface 230 that extends toward the other secondary support plate 23, and a plurality of pivot members 24 which are arranged in the front-rear direction (D1) and which are securely mounted on the base seat 11.

The rotating frame unit 21 of each rotating module 2 has two rotating brackets 211 which are respectively and rotatably disposed to the front and rear ends of the base seat 11, two connecting brackets 212 which respectively extend from the rotating brackets 211 in the front-rear direction (D1) and toward each other such that the primary support plate 22 is rested on the connecting brackets 212 to be rotated therewith, and two rotating shafts 213 which are respectively and rotatably mounted on the front and rear ends of the base seat 11 and which extend in the front-rear direction (D1) to be rotatable about a shaft axis in the front-rear direction (D1). Each rotating bracket 211 has an elongated sliding slot (211a) which is elongated to terminate at an inner end (211a1) and an outer end (211a2), and a guiding peg (211b) which extends in the front-rear direction (D1). The gear housing 12 is disposed to correspond with the rotating brackets 211 at either the front end or the rear end of the base seat 11, and has two arcuate guide slots 121 which are formed in a surface disposed opposite to the corresponding cover plate 14 in the front-rear direction (D1).

With reference to FIGS. 4 to 8, each connecting bracket 212 includes a bracket body (212a) extending from the corresponding rotating bracket 211, and a torsion unit (212b) disposed on the bracket body (212a). The torsion unit (212b) includes a plurality of frictional plates in frictional engagement with each other to provide a torsion force during pivoting of the rotating module 2 relative to the base seat 11 so as to angularly position the rotating module 2. Each rotating shaft 213 has a sliding section (213a) non-rotatably extended into and slidable along the elongated sliding slot (211a), and a gear engaging section (213b). The left and right ones of the gears 13 of each gear train are respectively connected and rotatable with the gear engaging sections (213b) of the rotating shafts 213 of the rotating modules 2 at either the front end or the rear end of the base seat 11 so as to make synchronous rotations of the rotating modules 2 between the initial position and the terminal position to shift the casing parts 20 between the unfolded state and the folded state. Specifically, the rotating brackets 211 are in spline engagement with the rotating shafts 213, respectively, to be rotated with the rotation of the rotating shafts 213 about the shaft axis. The guiding pegs (211b) are slidably extended into the guide slots 121, respectively. As such, when the rotating modules 2 are in the initial position, the elongated sliding slots (211a) extend in the left-right direction (D2) and the rotating shafts 213 are disposed in the outer ends (211a2) of the elongated sliding slots (211a). When the rotating modules 2 are in the terminal position, the elongated sliding slots (211a) extend in an up-down direction (D3) and the rotating shafts 213 are disposed in the inner ends (211a1) of the elongated sliding slots (211a). The up-down direction (D3) is transverse to both the front-rear direction (D1) and the left-right direction (D2).

Figure 8:
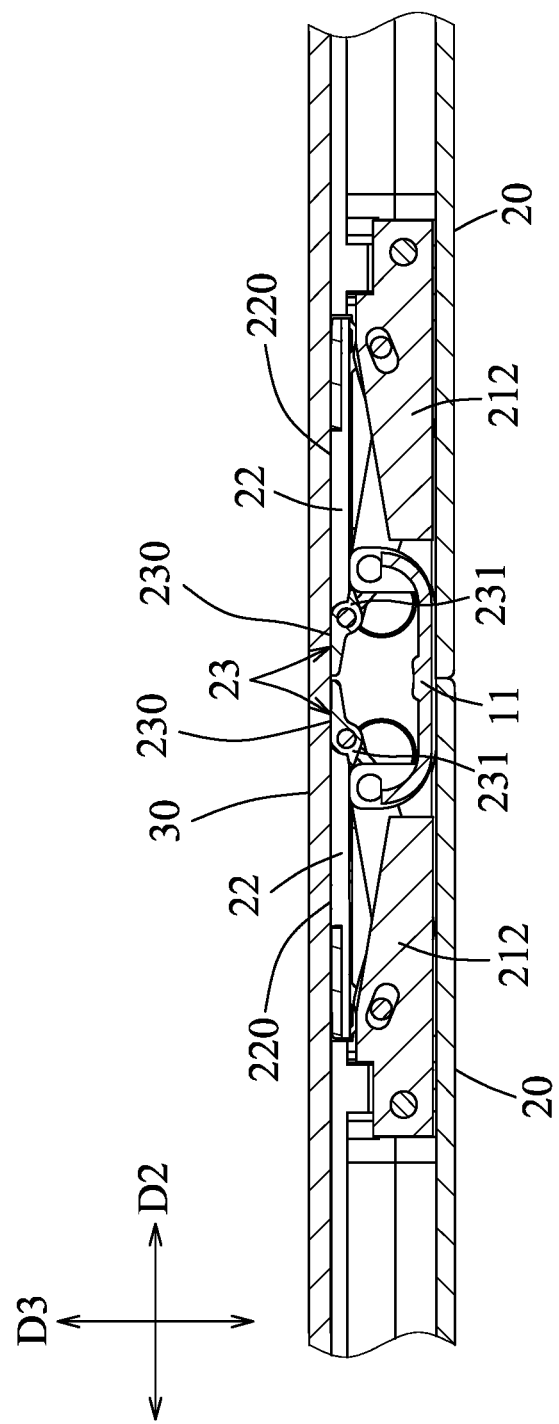
FIG. 8 is a fragmentary sectional view taken from line VIII-VIII of FIG. 1, illustrating that the rotating modules are in the initial position.

With reference to FIGS. 4 to 9, the primary support plate 22 of each rotating module 2 has a plurality of openings 221 (such as four openings 221) spaced apart from each other in the front-rear direction (D1). The pivot members 24 are respectively disposed in the openings 221 to be pivotally connected to the primary support plate 22 so as to permit rotation of the primary support plate 22 relative to the base seat 11. The primary support plate 22 is connected between the rotating frame unit 21 and the base seat 11 and is rotatable relative to the base seat 11 along with the rotation of the rotating frame unit 21. Specifically, the secondary support plates 23 are spaced apart from each other in the left-right direction (D2) by a distance which is smaller than a distance between the primary support plates 22. The secondary support plates 23 have a width which is measured in the left-right direction (D2) and which is larger than a height of the base seat 11 that is measured in the up-down direction (D3). The secondary support plate 23 of each rotating module 2 has a plurality of holding protrusions 231 which are spaced apart from each other and which extend toward the primary support plate 22. As shown in FIG. 8, in the initial position, the holding protrusions 231 abut against a bottom of the primary support plate 22 so as to keep the primary support surface 220 flush with the secondary support surface 230 in the left-right direction (D2) and to restrain turning of the secondary support plate 23 toward the base seat 11. Since the distance between the secondary support plates 23 is smaller than the distance between the primary support plates 22 such that the clearance between the rotating modules 2 at the base seat 11 is decreased in the unfolded state, the flexible display 30 can be rested and supported firmly on the primary and secondary support plates 22, 23. Furthermore, with the holding protrusions 231 abutting against the bottom of the corresponding primary support plate 22, a rotation of the secondary support plate 23 toward the base seat 11 can be prevented during usage of the flexible electronic device so as to avoid formation of dents at the clearance and adverse influence on usage of the flexible electronic device.

Figure 9:
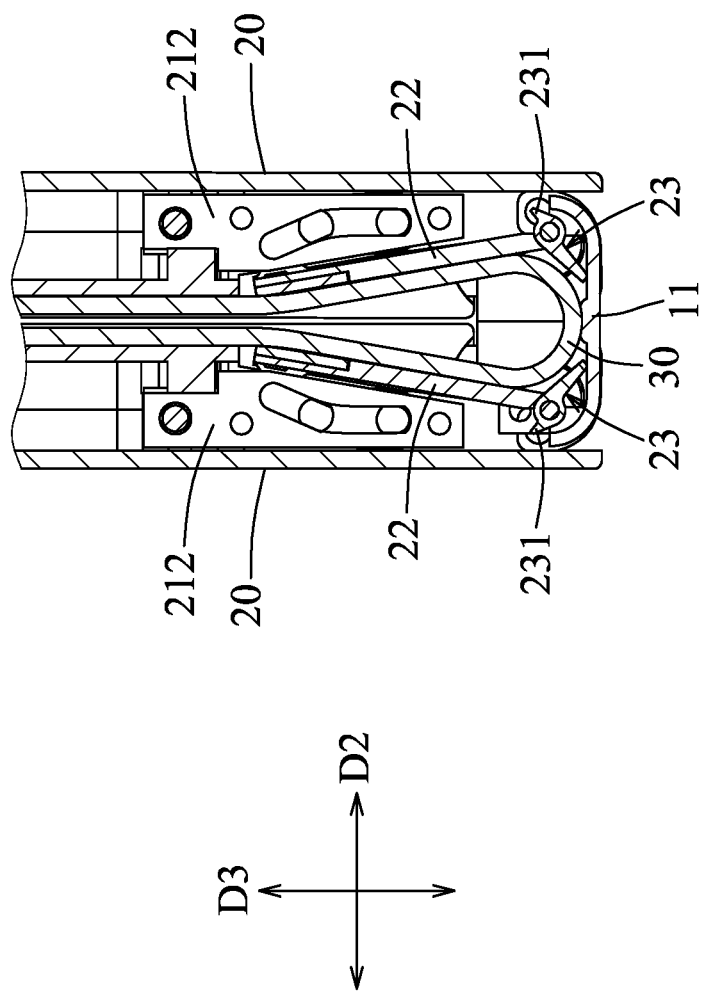
FIG. 9 is a fragmentary sectional view similar to FIG. 8, illustrating that the rotating modules are in the terminal position.

When the rotating modules 2 are rotated to the terminal position to bring the casing parts 20 to the folded state, as shown in FIG. 9, the secondary support plates 23 are turned relative to the primary support plates 22 away from the flexible display 30 to abut against the base seat 11 so as to provide a leeway between the secondary support plates 23 for accommodating the bending portion of the flexible display 30 and not to interfere with the base seat 11.

Figure 10:
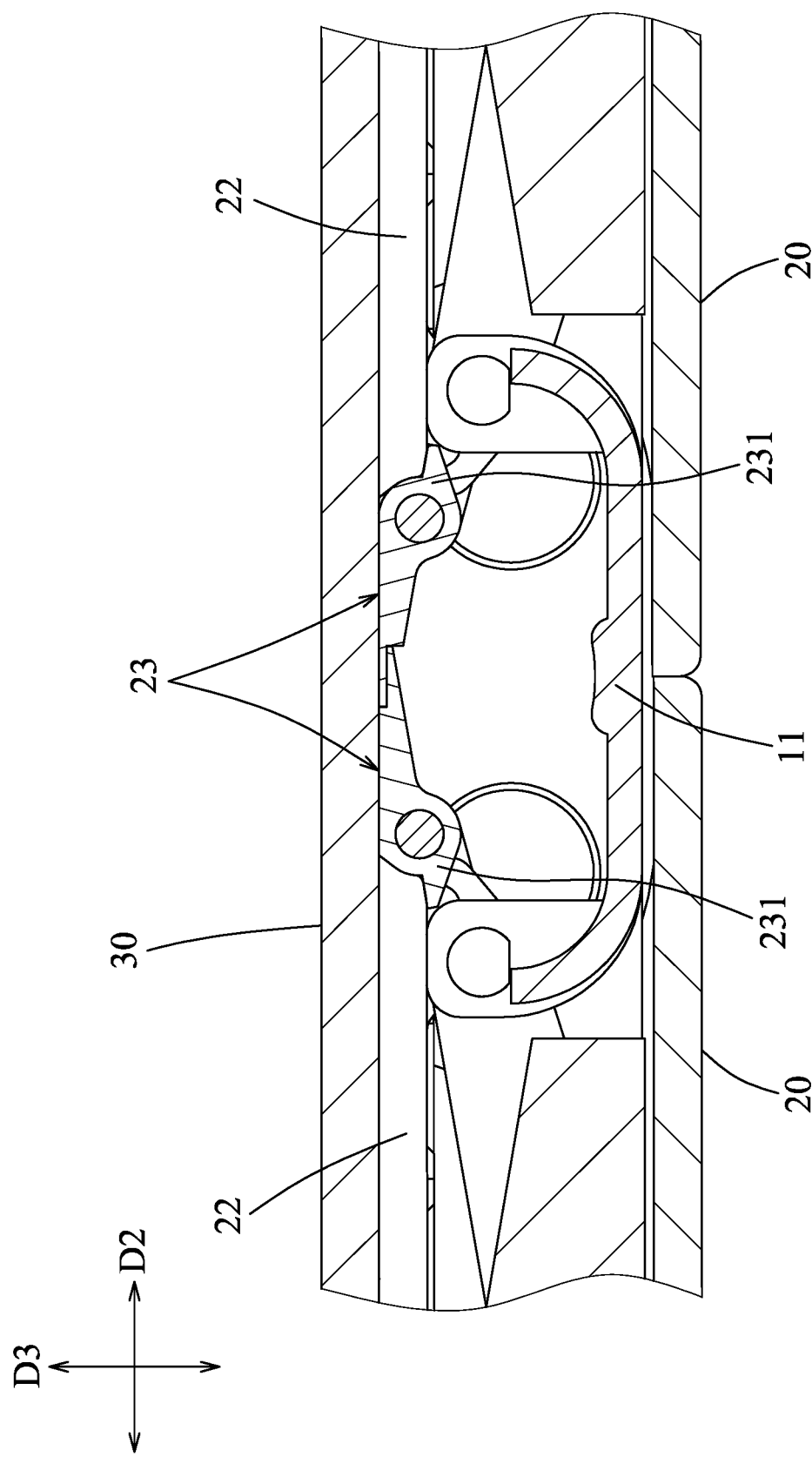
FIG. 10 is a fragmentary, enlarged sectional view similar to FIG. 8, illustrating another embodiment of the hinge according to the disclosure.

In other embodiments, the secondary support plates 23 of the rotating modules 2 are configured such that, in the initial position, the secondary support surfaces 230 have a total width which is measured in the left-right direction (D2) and which is substantially equal to as a clearance between the primary support surfaces 220 of the primary support plates 22. That is, a clearance between the rotating modules 2 in the unfolded state is minimized such that the flexible display 30 is supported firmly by the primary and secondary support plates 22, 23. In another embodiment, alternatively, as shown in FIG. 10, the total width of the secondary support surfaces 230 of the secondary support plates 23 may be larger than a clearance between the primary support surfaces 220 of the primary support plates 22 such that, in the initial position, the secondary support plates 23 are superimposed upon each other in the up-down direction (D3) to provide an efficient supporting force to the flexible display 30.

As illustrated, with the secondary support plates 23 of the rotating modules 2, the clearance between the rotating modules 2 at the base seat 11 is decreased in the unfolded state, and thus the flexible display 30 can be rested and supported firmly on the primary and secondary support plates 22, 23. Furthermore, when the rotating modules 2 are rotated to the terminal position to bring the casing parts 20 to the folded state, the secondary support plates 23 are rotated relative to the primary support plates 22 to provide a leeway for accommodating the bending portion of the flexible display 30 and not to interfere with the base seat 11.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hinge mountable between two casing parts of a flexible electronic device for mounting a flexible display thereon, comprising:
   a base seat unit including a base seat which is elongated in a front-rear direction and which has left and right sides opposite to each other in a left-right direction that is transverse to the front-rear direction; and
   two rotating modules respectively disposed at said left and right sides of said base seat, and respectively for mounting the casing parts thereon, each of said rotating modules including a primary support plate which is pivotably connected to a respective one of said left and right sides of said base seat and which has a primary support surface for resting the flexible display thereon, and a secondary support plate which is pivotably connected to said primary support plate and which has a secondary support surface that extends toward the other secondary support plate, said secondary support plate of each of said rotating modules having a plurality of holding protrusions which extend toward said primary support plate;
   said rotating modules being rotatable relative to said base seat between an initial position and a terminal position to shift the casing parts between an unfolded state and a folded state, respectively, in the initial position, said secondary support plates being spaced apart from each other in the left-right direction by a distance which is smaller than a distance between said primary support plates such that said secondary support surfaces are flush with said primary support surfaces in the left-right direction for resting the flexible display thereon, said secondary support plates having a width which is measured in the left-right direction and which is larger than a height of said base seat that is measured in an up-down direction transverse to both the front-rear direction and the left-right direction such that, in the terminal position, said secondary support plates are turned relative to said primary support plates away from the flexible display to abut against said base seat so as to provide a leeway between said secondary support plates, said holding protrusions abutting against a bottom of said primary support plate in the initial position so as to keep said primary support surface flush with said secondary support surface and to restrain turning of said secondary support plate toward said base seat.

2. The hinge as claimed in claim 1, wherein each of said rotating modules further includes a rotating frame unit which is rotatable relative to said base seat and on which a respective one of the casing parts is mounted, said primary support plate being connected between said rotating frame unit and said base seat and being rotatable relative to said base seat along with rotation of said rotating frame unit.

3. The hinge as claimed in claim 2, wherein said rotating frame unit of each of said rotating modules has two rotating brackets respectively and rotatably disposed to front and rear ends of said base seat, and two connecting brackets respectively extending from said rotating brackets in the front-rear direction and toward each other such that said primary support plate is rested on said connecting brackets to be rotated therewith.

4. The hinge as claimed in claim 3, wherein said rotating frame unit of each of said rotating modules further has two rotating shafts which are respectively and rotatably mounted on said front and rear ends of said base seat and which extend in the front-rear direction to be rotatable about a shaft axis in the front-rear direction, said rotating brackets being in spline engagement with said rotating shafts, respectively, so as to be rotated with rotation of said rotating shafts about the shaft axis.

5. The hinge as claimed in claim 4, wherein said base seat unit further includes two gear housings which are respectively disposed on said front and rear ends of said base seat, two gear trains each of which includes a plurality of gears received in a respective one of said gear housings, arranged along the left-right direction, and meshing with each other, and two cover plates which are respectively disposed outboard of said gear housings to cover said gear trains, left and right ones of said gears of each gear train being respectively connected and rotatable with said rotating shafts of said rotating modules at either said front end or said rear end of said base seat so as to make synchronous rotations of said rotating modules between the initial position and the terminal position to shift the casing parts between the unfolded state and the folded state.

6. The hinge as claimed in claim 5, wherein said rotating brackets of said rotating modules at either said front end or said rear end of said base seat respectively have elongated sliding slots which are elongated to terminate at inner ends and outer ends, and guiding pegs which extend in the front-rear direction, said rotating shafts of said rotating modules at either said front end or said rear end of said base seat being respectively and non-rotatably extended into and slidable along said elongated sliding slots, each of said gear housing having two arcuate guide slots which are disposed opposite to said cover plate in the front-rear direction and into which said guiding pegs are slidably extended, such that, when said rotating modules are in the initial position, said elongated sliding slots extend in the left-right direction and said rotating shafts are disposed in said outer ends of said elongated sliding slots, and such that, when said rotating modules are in the terminal position, said elongated sliding slots extend in the up-down direction and said rotating shafts are disposed in said inner ends.

7. The hinge as claimed in claim 1, wherein said primary support plate of each of said rotating modules has a plurality of openings spaced apart from each other in the front-rear direction, each of said rotating modules further including a plurality of pivot members which are securely mounted on said base seat and which are respectively disposed in said openings to be pivotally connected to said primary support plate so as to permit rotation of said primary support plate relative to said base seat.

8. The hinge as claimed in claim 1, wherein, when said rotating modules are in the initial position, said secondary support surfaces of said secondary support plates have a total width which is measured in the left-right direction and which is substantially equal to a clearance between said primary support surfaces of said primary support plates.

9. The hinge as claimed in claim 1, wherein, when said rotating modules are in the initial position, said secondary support surfaces of said secondary support plates have a total width which is measured in the left-right direction and which is larger than a clearance between said primary support surfaces of said primary support plates.

* * * * *